(12) United States Patent
Lee

(10) Patent No.: US 12,059,318 B2
(45) Date of Patent: Aug. 13, 2024

(54) ENDODONTIC FILE HOLDER

(71) Applicants: B&L BIOTECH, INC., Ansan-si (KR); In Whan Lee, Ansan-si (KR)

(72) Inventor: In Whan Lee, Seoul (KR)

(73) Assignees: B&L BIOTECH, INC., Ansan-si (KR); In Whan Lee, Ansan-si (KR)

( * ) Notice: Subject to any disclaimer, the term of this patent is extended or adjusted under 35 U.S.C. 154(b) by 0 days.

(21) Appl. No.: 17/496,893

(22) Filed: Oct. 8, 2021

(65) Prior Publication Data

US 2022/0387135 A1    Dec. 8, 2022

(30) Foreign Application Priority Data

Jun. 4, 2021 (KR) .......................... 10-2021-0072497

(51) Int. Cl.
*A61C 3/04* (2006.01)
*A61C 5/42* (2017.01)
*A61C 5/44* (2017.01)
*A61C 19/00* (2006.01)

(52) U.S. Cl.
CPC .................. *A61C 3/04* (2013.01); *A61C 5/42* (2017.02); *A61C 5/44* (2017.02); *A61C 19/006* (2013.01)

(58) Field of Classification Search
CPC .... A61C 3/04; A61C 5/42; A61C 5/44; A61C 19/006
See application file for complete search history.

(56) References Cited

U.S. PATENT DOCUMENTS

| 2,176,052 A | * | 10/1939 | Beyer .................. A44C 5/0046 224/267 |
| 3,933,286 A | | 1/1976 | Karkas |
| 4,976,615 A | | 12/1990 | Kravitz |

(Continued)

FOREIGN PATENT DOCUMENTS

| EP | 0 302 004 A2 | 2/1989 |
| EP | 0 302 004 A3 | 6/1989 |

(Continued)

OTHER PUBLICATIONS

Communication dated Jun. 15, 2022 from the Australian Patent Office in Australian Application No. 2021245262.

(Continued)

*Primary Examiner* — Nicholas D Lucchesi
*Assistant Examiner* — Hao D Mai
(74) *Attorney, Agent, or Firm* — Sughrue Mion, PLLC

(57) ABSTRACT

An endodontic file holder includes a wearing member worn on a part of the body; a holder body mounted on the outer side of the wearing member, having an inner side in which an accommodating space for accommodating a sponge is formed, and having openings through which the sponge accommodated in the accommodating space is exposed; a sponge inserted inside of the accommodating space formed in the holder body, wherein an endodontic file is inserted into the sponge; and a length measuring means provided in the holder body and configured to measure the length of an endodontic file, wherein at least one medicine receiving groove for accommodating a medicine for dental treatment to be applied to an endodontic file is formed on the upper surface of the holder body.

9 Claims, 6 Drawing Sheets

(56) References Cited

U.S. PATENT DOCUMENTS

| | | | | |
|---|---|---|---|---|
| 4,988,296 | A * | 1/1991 | Spencer | A61C 19/006 433/163 |
| 5,368,482 | A | 11/1994 | Johnsen et al. | |
| 5,749,730 | A * | 5/1998 | Johnsen | A61C 19/005 433/163 |
| 6,036,490 | A | 3/2000 | Johnsen et al. | |
| 6,257,888 | B1 * | 7/2001 | Barham | A61C 19/006 433/163 |
| 6,427,340 | B1 * | 8/2002 | Cohen | B26B 29/025 224/183 |
| 6,530,508 | B1 * | 3/2003 | Devine | A45F 5/00 224/267 |
| 9,204,710 | B1 * | 12/2015 | Burns | F16M 11/22 |
| 9,629,701 | B2 | 4/2017 | Oien et al. | |
| 9,943,159 | B1 * | 4/2018 | Novikova | A45D 40/22 |
| 10,478,177 | B2 * | 11/2019 | Gorek | A61B 17/0467 |
| 10,729,426 | B1 * | 8/2020 | Alzoman | A61B 17/0483 |
| D956,413 | S * | 7/2022 | Carter | D3/229 |
| 2004/0068820 | A1 * | 4/2004 | Johnsen | A61C 19/002 15/210.1 |
| 2004/0139642 | A1 * | 7/2004 | Johnsen | G09F 3/14 40/661.11 |
| 2005/0266374 | A1 * | 12/2005 | Tse | A61C 5/40 433/102 |
| 2007/0205124 | A1 * | 9/2007 | Johnsen | A61C 19/02 206/369 |
| 2007/0254264 | A1 * | 11/2007 | Nguyen | A61C 5/44 433/163 |
| 2009/0020571 | A1 * | 1/2009 | Toman | A45F 5/00 211/126.15 |
| 2011/0163137 | A1 * | 7/2011 | Podda-Heubach | A61B 50/20 224/183 |
| 2011/0229843 | A1 * | 9/2011 | Oien | A61C 19/002 433/77 |

FOREIGN PATENT DOCUMENTS

| | | |
|---|---|---|
| JP | 57-42809 U | 3/1982 |
| JP | 57-57818 U | 4/1982 |
| JP | 58-153811 U | 10/1983 |
| JP | 6-80410 U | 11/1994 |
| JP | 3043144 U | 8/1997 |
| JP | 2014-51762 A | 3/2014 |
| KR | 10-2011-0083512 A | 7/2011 |
| KR | 10-2013-0124661 A | 11/2013 |
| KR | 10-1373064 B1 | 3/2014 |
| KR | 10-2019-0051420 A | 5/2019 |

OTHER PUBLICATIONS

Extended European Search Report dated May 13, 2022 in European Application No. 21213158.5.
Japanese Office Action dated Dec. 20, 2022 in Japanese Application No. 2021-199662.
Korean Office Action dated Jun. 19, 2023 in Korean Application No. 10-2021-0072497.
Chinese Office Action issued May 13, 2024 in Application No. 202111186611.6.

* cited by examiner

[FIG. 1]
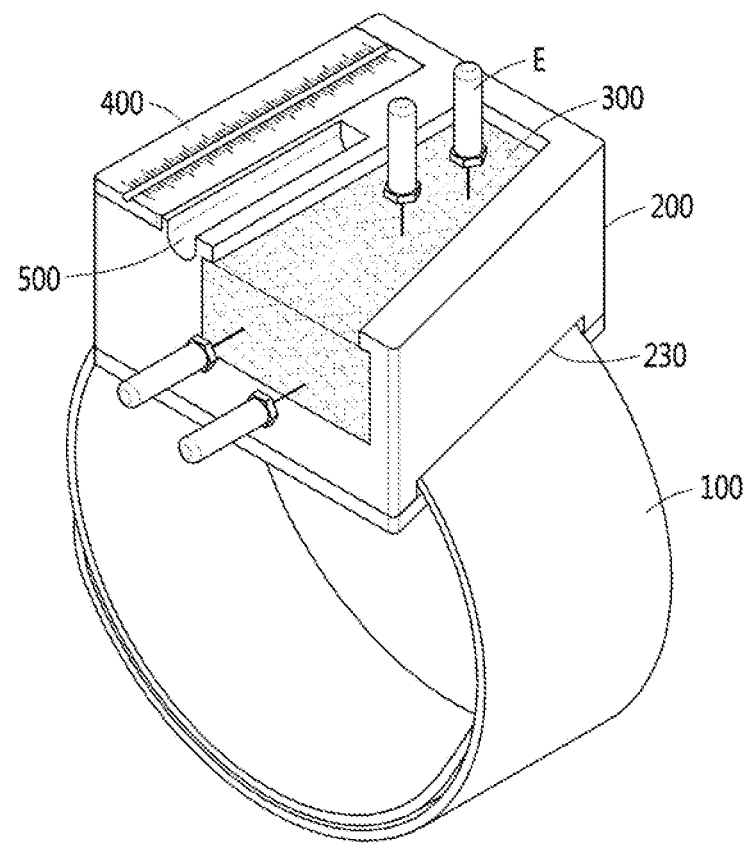

[FIG. 2]
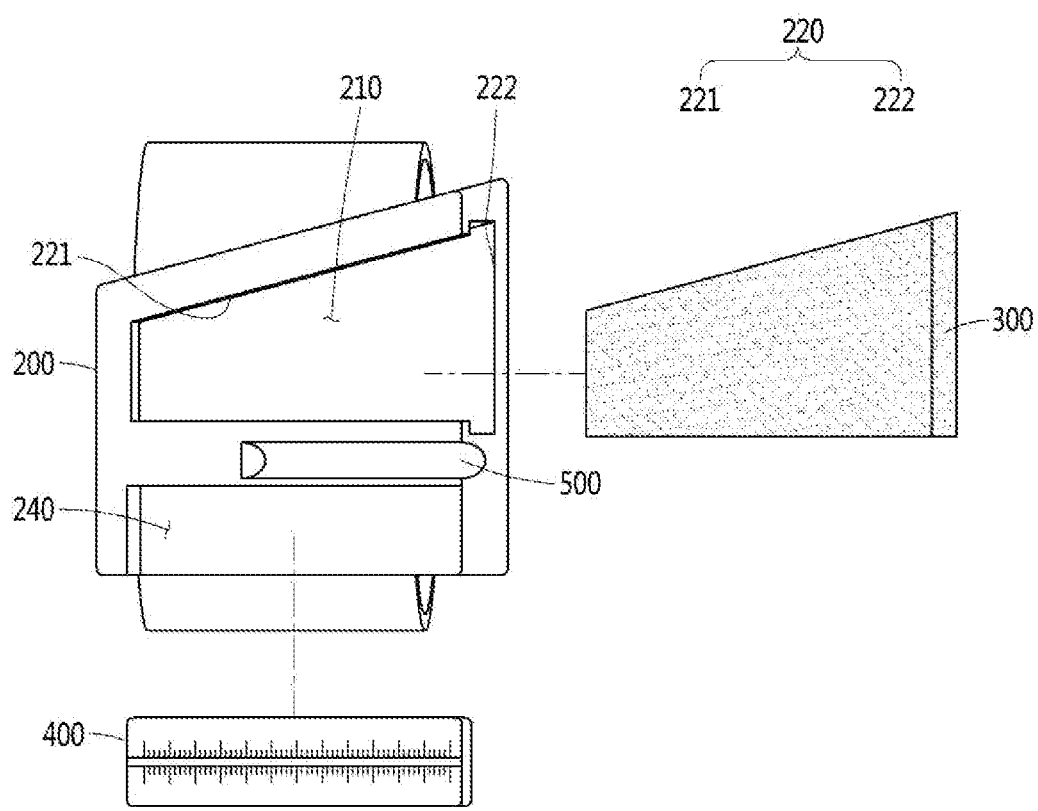

[FIG. 3]
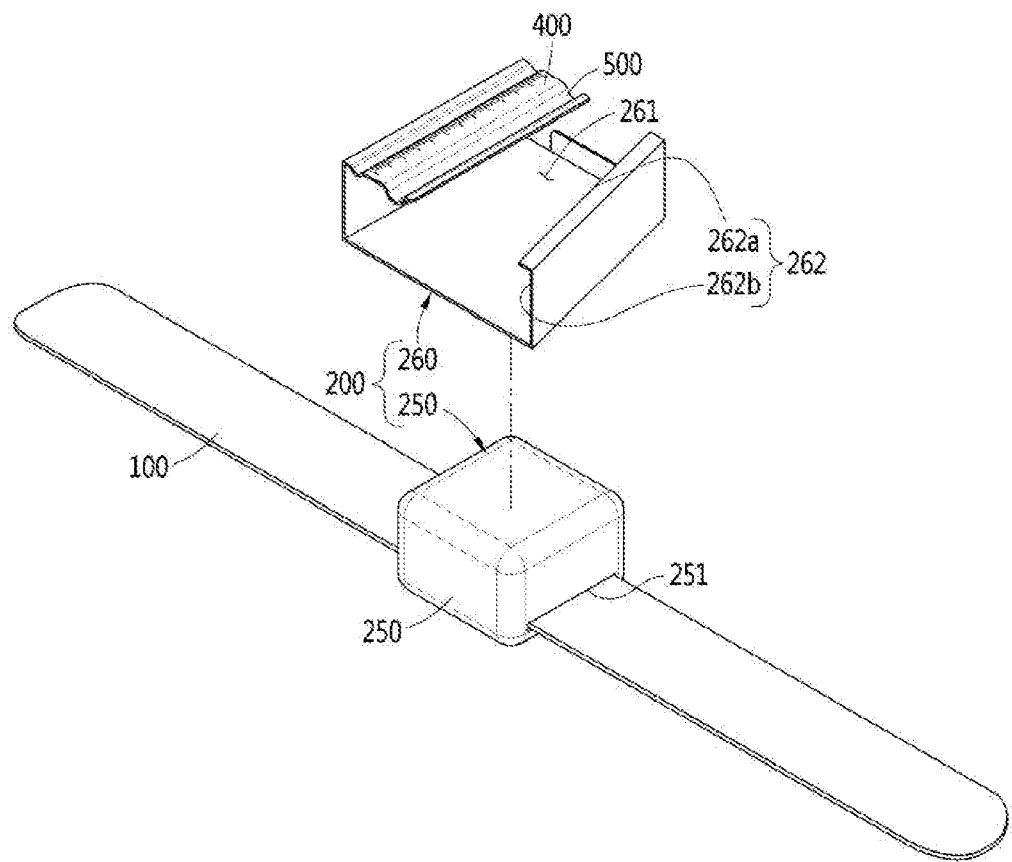

[FIG. 4]
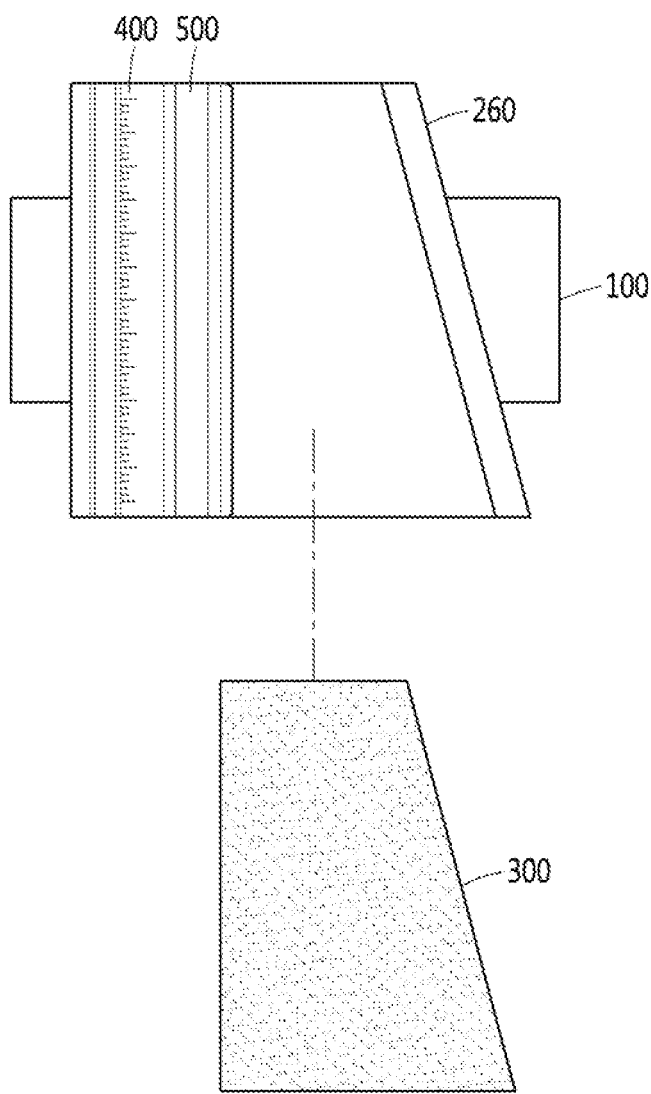

[FIG. 5A]
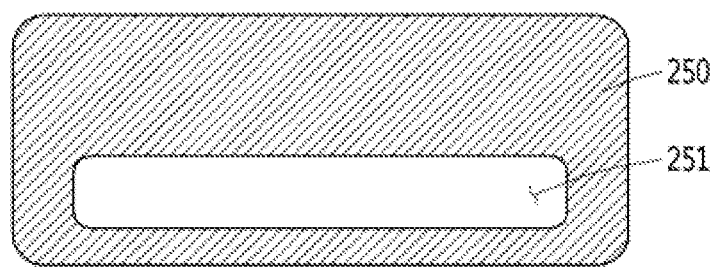
[FIG. 5B]
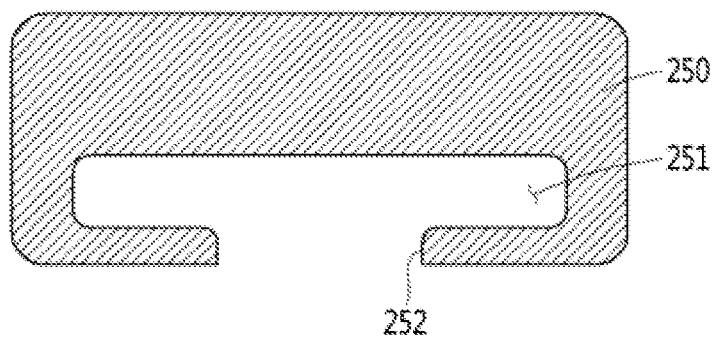

[FIG. 6]
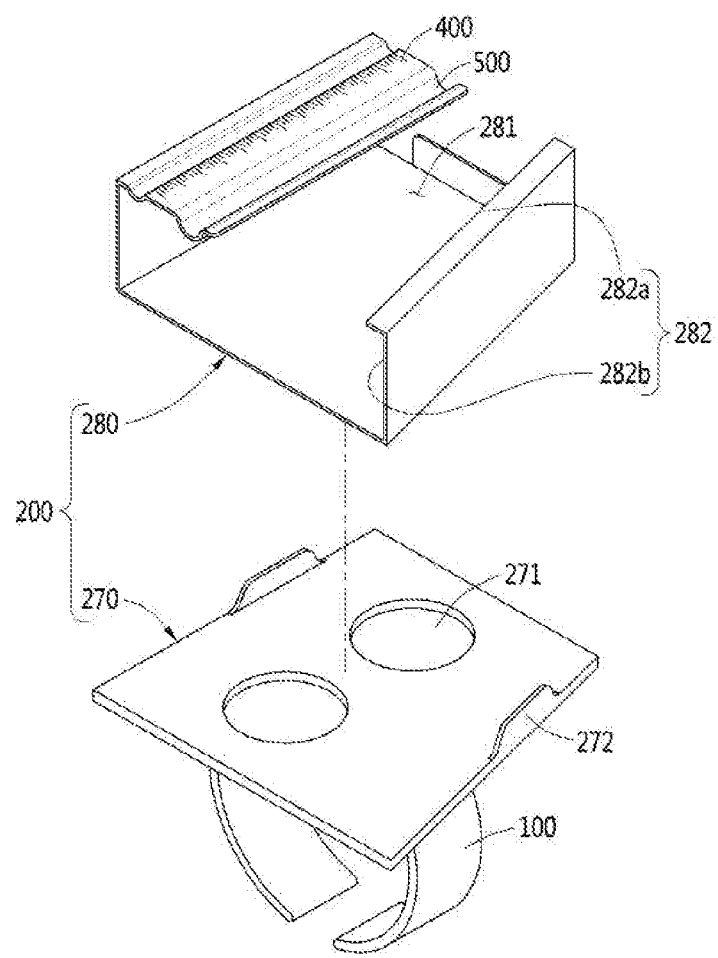

ENDODONTIC FILE HOLDER

CROSS-REFERENCE TO RELATED APPLICATION

This application claims priority to Korean Patent Application No. 10-2021-0072497, filed on Jun. 4, 2021 in the Korean Intellectual Property Office, the disclosure of which is incorporated herein by reference.

BACKGROUND OF THE DISCLOSURE

Field of the Disclosure

The present disclosure relates to an endodontic file holder, and more particularly, to an endodontic file holder capable of holding an endodontic file while being worn on a part of the body during dental treatment.

Description of the Related Art

When eating, teeth play an important role in cutting and mashing food for smooth digestion.

Accordingly, continuous care for and treatment of teeth is very important. However, when dental caries develops in the enamel of the teeth exposed inside the oral cavity, the decayed teeth are often left unattended at an early stage. The reason for this is that enamel, which is a hard tissue harder than bone, does not have nerves, so even if dental caries occurs, no pain is felt.

Accordingly, people often go for treatment when they feel pain due to dental caries, that is, when dental caries has invaded the pulp of the tooth.

The pulp located inside the tooth is a soft tissue in which a number of nerves and blood vessels are distributed. When dental caries invades the pulp, the pulp's soft tissue cannot be regenerated and dies. Accordingly, in dentistry, a method of reducing toothache by removing both nerves and blood vessels of the pulp, that is, endodontic treatment, is often performed.

A tool for removing the dental nerves of the pulp in this way is commonly referred to as an endodontic file. Since an endodontic file must be deeply inserted into the tooth and bent according to the shape of the tooth, the endodontic file is formed of a material having elasticity. In addition, to measure the length of a root canal, endodontic files are manufactured in various lengths.

Recently, the need for an endodontic file holder that can temporarily hold an endodontic file during endodontic treatment in dentistry is increasing.

RELATED ART DOCUMENTS

Patent Documents (Patent Document 1) Korean Patent No. 10-1373064 (publication date: Mar. 11, 2014)

SUMMARY OF THE DISCLOSURE

Therefore, the present disclosure has been made in view of the above problems, and it is an object of the present disclosure to provide an endodontic file holder having a configuration characterized in that a medicine receiving groove on which a medicine for dental treatment is squeezed and mixed is formed on the outer surface of a holder body for holding an endodontic file while being worn on a part of the body during dental treatment. With this configuration, when the endodontic file holder is used, an operation of applying a medicine to an endodontic file may be performed quickly, allowing a therapist to use the endodontic file quickly.

It is another object of the present disclosure to provide an endodontic file holder having a configuration characterized in that a holder body for supporting an endodontic file is detachably attached, by magnetic force, to a wearing member worn on a part of the body, such as a finger, a wrist, or an arm, of a therapist performing dental treatment. With this configuration, when the endodontic file holder is used, a therapist may easily replace and use various holder bodies.

In accordance with one aspect of the present disclosure, provided is an endodontic file holder, wherein the endodontic file holder is a holder for holding an endodontic file for dental treatment and includes a wearing member worn on a part of a body; a holder body mounted on an outer side of the wearing member, having an inner side in which an accommodating space for accommodating a sponge is formed, and having openings through which the sponge accommodated in the accommodating space is exposed; a sponge inserted inside of the accommodating space formed in the holder body, wherein an endodontic file is inserted into the sponge; and a length measuring means provided in the holder body and configured to measure a length of an endodontic file, wherein at least one medicine receiving groove for accommodating a medicine for dental treatment to be applied to an endodontic file is formed on an upper surface of the holder body.

A through hole penetrating both sides of the holder body may be formed at a lower end of the holder body, and the wearing member may be a band-type wrist strap made of an elastic material configured to pass through the through hole formed in the holder body and worn on a wrist.

A first opening through which an upper side of the accommodating space is opened and a second opening through which one side or both sides of the accommodating space are opened may be formed in the holder body. An upper surface of the sponge may be exposed through the first opening, and a side of the sponge may be exposed through the second opening.

On an upper surface of the holder body, an engraved mounting groove on which the length measuring means is mounted may be formed, and the length measuring means may be a ruler press-fitted into an inside of the mounting groove in a sliding manner.

The holder body may include a housing having a through hole penetrating both sides of a lower end thereof so that the wearing member is mounted thereon, wherein a magnet is accommodated inside the housing; and a body made of a metal material having a property of being attached to a magnet so that a lower surface of the body is detachably attached to an upper surface of the housing, having an inner side in which an accommodating space for accommodating the sponge is formed, and having openings through which the sponge accommodated in the accommodating space is exposed. In this case, the wearing member may be a band-type wrist strap made of an elastic material configured to pass through the through hole formed in the housing and worn on a wrist.

The holder body may include a housing having a through hole penetrating both sides of a lower end thereof so that the wearing member is mounted thereon and formed of a metal material having a property of being attached to a magnet; and a body having a magnet accommodated therein so that a lower surface of the body is detachably attached to an upper surface of the housing, having an inner side in which an accommodating space for accommodating the sponge is formed, and having openings through which the sponge accommodated in the accommodating space is exposed. In this case, the wearing member may be a band-type wrist strap made of an elastic material configured to pass through the through hole formed in the housing and worn on a wrist.

A first opening through which an upper side of the accommodating space is opened and a second opening through which one side or both sides of the accommodating space are opened may be formed in the body. An upper surface of the sponge may be exposed through the first opening, and a side of the sponge may be exposed through the second opening.

In a center of a lower surface of the housing, a lower surface opening in which a lower center of the through hole is opened may be further formed, and the wrist strap may be released through the lower surface opening, so that the housing and the wrist strap are separated from each other.

The length measuring means may be provided in a form of gradations printed on an upper surface of the body.

The holder body may include a mounting plate having a lower surface on which the wearing member is integrally formed and having an upper surface on which mounting grooves to which magnets are attached are formed; and a body made of a metal material having a property of being attached to a magnet so that a lower surface of the body is detachably attached to an upper surface of the mounting plate, having an inner side in which an accommodating space for accommodating the sponge is formed, and having openings through which the sponge accommodated in the accommodating space is exposed. In this case, the wearing member may be a ring worn on a finger.

The holder body may include a mounting plate having a lower surface on which the wearing member is integrally formed and made of a metal material having a property of being attached to a magnet; and a body having a lower surface on which mounting grooves to which magnets are attached are formed so that a lower surface of the body is detachably attached to an upper surface of the mounting plate, having an inner side in which an accommodating space for accommodating the sponge is formed, and having openings through which the sponge accommodated in the accommodating space is exposed. In this case, the wearing member may be a ring worn on a finger.

Locking stepped portions configured to extend upward to a predetermined height from both edges of the mounting plate may be further formed so that the body mounted on an upper surface of the mounting plate is fixed to the mounting plate.

A first opening through which an upper side of the accommodating space is opened and a second opening through which one side or both sides of the accommodating space are opened may be formed in the body. An upper surface of the sponge may be exposed through the first opening, and a side of the sponge may be exposed through the second opening.

The length measuring means may be provided in a form of gradations printed on an upper surface of the body.

The medicine receiving groove may be formed on an upper surface of the body.

BRIEF DESCRIPTION OF THE DRAWINGS

The above and other objects, features and other advantages of the present disclosure will be more clearly understood from the following detailed description taken in conjunction with the accompanying drawings, in which:

FIGS. 1 and 2 illustrate an endodontic file holder according to the first embodiment of the present disclosure;

FIGS. 3 to 5B illustrate an endodontic file holder according to the second embodiment of the present disclosure: and FIG. 6 illustrates an endodontic file holder according to the third embodiment of the present disclosure.

DETAILED DESCRIPTION OF THE DISCLOSURE

Hereinafter, with reference to the accompanying drawings, preferred embodiments of an endodontic file holder according to the present disclosure will be described in detail.

FIGS. 1 and 2 illustrate an endodontic file holder according to the first embodiment of the present disclosure.

Referring to FIGS. 1 and 2, an endodontic file holder according to the first embodiment of the present disclosure is a holder for holding an endodontic file (E) for dental treatment, and includes a wearing member 100, a holder body 200, a sponge 300, a length measuring means 400, and a medicine receiving groove 500. Each component will be described in detail as follows.

The wearing member 100 is a member worn on a part of the body, such as a finger, a wrist, or an arm, of a therapist performing dental treatment. Accordingly, the wearing member 100 according to the first embodiment of the present disclosure is preferably a band-type wrist strap made of an elastic material suitable for wearing on the wrist of a therapist.

The holder body 200 is mounted on the outer side of a wrist strap, which is the wearing member 100, an accommodating space 210 for accommodating the sponge 300 to be described later is formed inside the holder body 200, and openings 220 through which the sponge 300 accommodated in the accommodating space 210 is exposed are formed in the holder body 200.

At the lower end of the holder body 200, a through hole 230 penetrating both sides of the holder body 200 is formed. The wrist strap, which is the wearing member 100, is configured to pass through the through hole 230 formed in the holder body 200. With this configuration, the wrist strap on which the holder body 200 is mounted may be worn on the therapist's wrist to wrap around the wrist.

The sponge 300 is a member into which the endodontic file (E) is inserted for temporarily mounting the endodontic file (E) while a therapist performs dental treatment. The sponge 300 is inserted inside the accommodating space 210 formed in the holder body 200.

In the holder body 200, a first opening 221, through which an upper side of the accommodating space 210 on which the sponge 300 is mounted is opened, and a second opening 222, through which one side or both sides of the accommodating space 210 are opened, are formed.

That is, the upper surface of the sponge 300 mounted on the holder body 200 is exposed through the first opening 221 formed on the upper surface of the holder body 200, and the side of the sponge 300 mounted on the holder body 200 is exposed through the second opening 222 formed on the side of the holder body 200.

With this configuration, since the upper surface and the side of the sponge 300 mounted on the holder body 200 are exposed, the endodontic file (E) may be inserted into the upper surface and the side of the sponge 300.

The length measuring means 400 is provided in the holder body 200 and serves to measure the length of the endodontic file (E). The length measuring means 400 according to the first embodiment of the present disclosure is preferably a ruler detachably coupled to the holder body 200.

On the upper surface of the holder body 200, an engraved mounting groove 240 on which the ruler, which is the length measuring means 400, is mounted may be formed.

That is, in a state in which gradations printed on the upper surface of the ruler face upward, the ruler is press-fitted into the inside of the mounting groove 240 formed on the upper surface of the holder body 200 in a sliding manner.

In addition, at least one medicine receiving groove 500 on which a medicine for dental treatment to be applied to the endodontic file (E) is squeezed and mixed is formed on the upper surface of the holder body 200.

By forming, on the upper surface of the holder body 200, at least one medicine receiving groove 500 on which a medicine for dental treatment is squeezed and mixed, an operation of applying the medicine to the endodontic file (E) may be performed quickly.

FIGS. 3 to 5B illustrate an endodontic file holder according to the second embodiment of the present disclosure.

Referring to FIGS. 3 to 5B, an endodontic file holder according to the second embodiment of the present disclosure may include the wearing member 100, the holder body 200, the sponge 300, the length measuring means 400, and the medicine receiving groove 500.

The wearing member 100 is a member worn on a part of the body of a therapist performing dental treatment. Accordingly, the wearing member 100 according to the second embodiment of the present disclosure is preferably a band-type wrist strap made of an elastic material suitable for wearing on the wrist of a therapist.

The holder body 200 includes a housing 250 having a through hole 251 penetrating both sides of the lower end of the housing 250 so that the wrist strap, which is the wearing member 100, is mounted thereon. In this case, a magnet is accommodated inside the housing 250.

That is, the wrist strap, which is the wearing member 100, is configured to pass through the through hole 251 formed in the housing 250 and is worn on the therapist's wrist to wrap around the wrist.

In addition, in the center of the lower surface of the housing 250, a lower surface opening 252 in which the lower center of the through hole 251 is opened may be further formed.

That is, by releasing the wrist strap through the lower surface opening 252 formed in the housing 250, the housing 250 and the wrist strap may be separated from each other. Conversely, through the lower surface opening 252 formed in the housing 250, the wrist strap may be mounted on the housing 250.

In addition, the holder body 200 includes a body 260 made of a metal material having a property of being attached to a magnet so that the lower surface of the body 260 is detachably attached to the upper surface of the housing 250.

In this case, an accommodating space 261 for accommodating the sponge 300 is formed inside the body 260. In addition, in the body 260, openings 262 through which the sponge 300 accommodated in the accommodating space 261 is exposed are formed.

The sponge 300 is a member into which the endodontic file (E) is inserted for temporarily mounting the endodontic file (E) while a therapist performs dental treatment. The sponge 300 is inserted inside the accommodating space 261 formed in the body 260.

In the body 260, a first opening 262*a* through which the upper side of the accommodating space 261 for accommodating the sponge 300 is opened and a second opening 262*b* through which one side or both sides of the accommodating space 261 are opened are formed.

That is, through the first opening 262*a* formed in the upper surface of the body 260, the upper surface of the sponge 300 mounted on the body 260 is exposed. In addition, through the second opening 262*b* formed in the side of the body 260, the side of the sponge 300 mounted on the body 260 is exposed.

With this configuration, since the upper surface and the side of the sponge 300 mounted on the body 260 are exposed, the endodontic file (E) may be inserted into the upper surface and the side of the sponge 300.

The length measuring means 400 is provided in the holder body 200 and serves to measure the length of the endodontic file (E). In this case, the length measuring means 400 according to the second embodiment of the present disclosure is preferably provided in the form of gradations printed on the upper surface of the body 260. In addition, as another embodiment, like the length measuring means 400 of the first embodiment described above, the length measuring means 400 may be a ruler detachably coupled to the body 260.

In addition, on the upper surface of the body 260, at least one medicine receiving groove 500 on which a medicine for dental treatment to be applied to the endodontic file (E) is squeezed and mixed is formed.

By forming, on the upper surface of the body 260, at least one medicine receiving groove 500 on which a medicine for dental treatment is squeezed and mixed, an operation of applying the medicine to the endodontic file (E) may be performed quickly.

FIG. 6 illustrates an endodontic file holder according to the third embodiment of the present disclosure.

Referring to FIG. 6, an endodontic file holder according to the third embodiment of the present disclosure may include the wearing member 100, the holder body 200, the sponge 300, the length measuring means 400, and the medicine receiving groove 500.

The wearing member 100 is a member worn on a part of the body of a therapist performing dental treatment. Accordingly, the wearing member 100 according to the third embodiment of the present disclosure is preferably a ring worn on the therapist's finger.

The ring, which is the wearing member 100, is integrally formed on the lower surface of the holder body 200. In addition, a mounting plate 270 having mounting grooves 271 to which magnets are attached is formed on the upper surface of the holder body 200.

In addition, the holder body 200 includes a body 280 made of a metal material having a property of being attached to a magnet so that the lower surface of the body 280 is detachably attached to the upper surface of the mounting plate 270 to which magnets are attached. In addition, as another embodiment, the holder body 200 may include the mounting plate 270 made of a metal material having a property of being attached to a magnet so that the mounting plate 270 is attached to the lower surface of the body 280.

In this case, locking stepped portions 272 configured to extend upward to a predetermined height from both edges of the mounting plate 270 may be further formed so that the body 280 mounted on the upper surface of the mounting plate 270 by magnetic force is fixed to the mounting plate 270 without being separated in the lateral direction of the mounting plate 270.

An accommodating space 281 for accommodating the sponge 300 is formed inside the body 280. In addition, in the body 280, openings 282 through which the sponge 300 accommodated in the accommodating space 281 is exposed are formed.

The sponge 300 is a member into which the endodontic file (E) is inserted for temporarily mounting the endodontic file (E) while a therapist performs dental treatment. The sponge 300 is inserted inside of the accommodating space 281 formed in the body 280.

In the body 280, a first opening 282a through which the upper side of the accommodating space 281 for accommodating the sponge 300 is opened and a second opening 282b through which one side or both sides of the accommodating space 281 are opened are formed.

That is, through the first opening 282a formed in the upper surface of the body 280, the upper surface of the sponge 300 mounted on the body 280 is exposed. Through the second opening 282b formed in the side of the body 280, the side of the sponge 300 mounted on the body 280 is exposed.

With this configuration, since the upper surface and the side of the sponge 300 mounted on the body 280 are exposed, the endodontic file (E) may be inserted into the upper surface and the side of the sponge 300.

The length measuring means 400 is provided in the holder body 200 and serves to measure the length of the endodontic file (E). In this case, the length measuring means 400 according to the third embodiment of the present disclosure is preferably provided in the form of gradations printed on the upper surface of the body 280. In addition, as another embodiment, like the length measuring means 400 of the first embodiment described above, the length measuring means 400 may be a ruler detachably coupled to the body 280.

In addition, on the upper surface of the body 280, at least one medicine receiving groove 500 on which a medicine for dental treatment to be applied to the endodontic file (E) is squeezed and mixed is formed.

By forming, on the upper surface of the body 280, at least one medicine receiving groove 500 on which a medicine for dental treatment is squeezed and mixed, an operation of applying the medicine to the endodontic file (E) may be performed quickly.

According to the present disclosure, by forming a medicine receiving groove, on which a medicine for dental treatment is squeezed and mixed, on the outer surface of a holder body for holding an endodontic file while being worn on a part of the body during dental treatment, an operation of applying a medicine to an endodontic file can be performed quickly, allowing a therapist to use the endodontic file quickly.

In addition, according to the present disclosure, by detachably attaching, by magnetic force, a holder body for supporting an endodontic file to a wearing member worn on a part of the body, such as a finger, a wrist, or an arm, of a therapist performing dental treatment, a therapist can easily replace and use various holder bodies.

In the above, the present disclosure has been described based on preferred embodiments, but the technical spirit of the present disclosure is not limited thereto. In addition, it will be apparent to those of ordinary skill in the art to which the present disclosure pertains that modifications or changes are possible within the scope of the claims. In addition, such modifications or changes are within the scope of the following claims.

DESCRIPTION OF SYMBOLS

| | |
|---|---|
| 100: WEARING MEMBER | 200: HOLDER BODY |
| 210, 261, 281: ACCOMMODATING SPACE | 220, 262, 282: OPENINGS |
| 221, 262a, 282a: FIRST OPENING | 222, 262b, 282b: SECOND OPENING |
| 230, 251: THROUGH HOLE | 240, 271: MOUNTING GROOVE |
| 250: HOUSING | 252: LOWER SURFACE OPENING |
| 260, 280: BODY | 270: MOUNTING PLATE |
| 272: LOCKING STEPPED PORTIONS | 300: SPONGE |
| 400: LENGTH MEASURING MEANS | 500: MEDICINE RECEIVING GROOVE |

What is claimed is:

1. An endodontic file holder for holding an endodontic file for dental treatment, the endodontic file holder comprising:
a wearing member to be worn on a part of a body;
a sponge for holding the endodontic file;
a holder body mounted on an outer side of the wearing member, having an inner side in which an accommodating space for accommodating the sponge is formed, and having openings through which the sponge accommodated in the accommodating space is exposed, wherein the holder body has an upper side, a lower side opposite to the upper side, a front side and a rear side opposite to the front side, and the holder body extends from the front side to the rear side in a horizontal direction, and the upper side faces a vertical direction perpendicular to the horizontal direction;
a length measuring means extending in the horizontal direction and provided in the holder body and configured to measure a length of the endodontic file,
wherein the sponge is disposed inside of the accommodating space formed in the holder body,
wherein a medicine receiving groove for accommodating a medicine for dental treatment to be applied to the endodontic file is formed on the upper side of the holder body,
wherein the openings of the holder body include a first opening through which an upper side of the accommodating space is opened and a second opening through which a front side of the accommodating space are opened, the upper side of the accommodation space being perpendicular to the front side of the accommodating space,
wherein the first opening faces the vertical direction, and the second opening is formed on the front side of the holder body,
wherein the sponge includes an upper side exposed through the first opening of the holder body and facing the vertical direction, a front side exposed through the second opening, and a rear side opposite to the front side of the sponge, the sponge extending from the front side of the sponge to the rear side of the sponge in the horizontal direction,
wherein an entire surface of the front side of the sponge is exposed through the second opening of the holder body, and only a part of an entire surface of the upper side of the sponge is exposed through the first opening of the holder body,
wherein the front side of the sponge is formed on a same plane as the front side of the holder body,
wherein the upper side of the holder body is parallel to the upper side of the sponge, wherein a mounting groove extending in the horizontal direction is formed on the upper side of the holder body, wherein the length measuring means is disposed in an inside of the mounting groove formed on the upper side of the holder body, and wherein the medicine receiving groove extends in the horizontal direction and is parallel to the length measuring means and formed between the length measuring means and the first opening of the upper side of the holder body.

2. The endodontic file holder according to claim 1, wherein a through hole penetrating the holder body is formed at a lower end of the holder body, and the wearing member is a band-type wrist strap made of an elastic material and configured to pass through the through hole formed in the holder body and to be worn on a wrist of the body.

3. The endodontic file holder according to claim 1, wherein the length measuring means is a ruler press-fitted into the inside of the mounting groove in a sliding manner.

4. An endodontic file holder for holding an endodontic file for dental treatment, the endodontic file holder comprising:

a wearing member to be worn on a body;

a housing having a through hole penetrating a lower end of the housing and a magnet accommodated inside the housing;

a sponge for holding the endodontic file; and a body part made of a metal material having a property of being attached to a magnet so that a lower surface of the body part is detachably attached to an upper surface of the housing, having an inner side in which an accommodating space for accommodating the sponge is formed, and having openings through which the sponge accommodated in the accommodating space is exposed, wherein the body part has an upper side, a lower side opposite to the upper side, a front side and a rear side opposite to the front side, and the body part extends from the front side to the rear side in a horizontal direction, and the upper side faces a vertical direction perpendicular to the horizontal direction, wherein the sponge is disposed inside of the accommodating space formed in the body part, wherein the body part includes a length measuring means extending in the horizontal direction and provided on the upper side of the body part and configured to measure a length of the endodontic file, and a medicine receiving groove for accommodating a medicine for dental treatment formed on the upper side of the body part, wherein the openings of the body part include an upper opening through which an upper side of the accommodating space is opened, a front opening through which a front side of the accommodating space is opened, and a rear opening through which a rear side of the accommodating space is opened, the upper side of the accommodation space being perpendicular to the front side of the accommodating space, wherein the upper opening faces the vertical direction, the front opening is formed in the front side of the body part, and the rear opening is formed in the rear side of the body part, wherein the sponge includes an upper side exposed through the upper opening of the body part and facing the vertical direction, a front side exposed through the front opening, and a rear side opposite to the front side of the sponge, the sponge extending from the front side of the sponge to the rear side of the sponge in the horizontal direction, wherein an entire surface of the front side of the sponge is exposed through the front opening of the body part, and only a part of an entire surface of the upper side of the sponge is exposed through the upper opening of the body part, wherein the front side of the sponge is formed on a same plane as the front side of the body part, wherein the upper side of the body part is parallel to the upper side of the sponge, wherein the medicine receiving groove extends in the horizontal direction and is parallel to the length measuring means and formed between the length measuring means and the upper opening formed in the upper side of the body part, and wherein the wearing member is a band-type wrist strap made of an elastic material and configured to pass through the through hole formed in the housing.

5. The endodontic file holder according to claim 4, wherein, the housing has a lower surface opening in a center of a lower surface of the housing, and the wrist strap is released through the lower surface opening, so that the housing and the wrist strap are separated from each other.

6. The endodontic file holder according to claim 4, wherein the length measuring means is provided in a form of gradations printed on the upper surface of the body part.

7. An endodontic file holder for holding an endodontic file for dental treatment, the endodontic file holder comprising:

a wearing member to be worn on a part of a body;

a mounting plate having a lower surface on which the wearing member is integrally formed and having an upper surface on which mounting grooves to which magnets are attached are formed;

a sponge for holding the endodontic file; and a body part made of a metal material having a property of being attached to a magnet so that a lower surface of the body part is detachably attached to the upper surface of the mounting plate, having an inner side in which an accommodating space for accommodating the sponge is formed, and having openings through which the sponge accommodated in the accommodating space is exposed, wherein the body part has an upper side, a lower side opposite to the upper side, a front side and a rear side opposite to the front side, and the body part extends from the front side to the rear side in a horizontal direction, and the upper surface of the body part faces a vertical direction perpendicular to the horizontal direction, wherein the sponge is disposed inside of the accommodating space formed in the body part, wherein the body part includes a length measuring means extending in the horizontal direction and provided on the upper surface of the body part and configured to measure a length of the endodontic file, and a medicine receiving groove for accommodating a medicine for dental treatment formed on the upper side of the body part, wherein the openings of the body part include an upper opening through which an upper side of the accommodating space is opened, a front opening through which a front side of the accommodating space is opened, and a rear opening through which a rear side of the accommodating space is opened, the upper side of the accommodation space being perpendicular to the front side of the accommodating space, wherein the upper opening faces the vertical direction, the front opening is formed in the front side of the body part, and the rear opening is formed in the rear side of the body part, wherein the sponge includes an upper side exposed through the upper opening of the body part and facing the vertical direction, a front side exposed through the front opening, and a rear side opposite to the front side of the sponge, the sponge extending from the front side of the sponge to the rear side of the sponge in the horizontal direction, wherein an entire surface of the front side of the sponge is exposed through the front opening of the body part, and only a part of an entire surface of the upper side of the sponge is exposed through the upper opening of the body part, wherein the front side of the sponge is formed on a same plane as the front side of the body part, wherein the upper side of the body part is parallel to the upper side of the sponge, wherein the medicine receiving groove extends in the horizontal direction and is parallel to the length measuring means and formed between the length measuring means and the upper opening formed in the upper side of the body part, and wherein the wearing member is a ring to be worn on a finger of the body.

8. The endodontic file holder according to claim 7, wherein the body part includes a left side and a right side opposite to the left side, and the mounting plate has a left edge and a right edge opposite to the left edge, and wherein locking stepped portions configured to extend upward to a predetermined height from the left and right edges of the mounting plate are further formed so that the body part mounted on the upper surface of the mounting plate is fixed to the mounting plate by the locking stepped portions.

9. The endodontic file holder according to claim 7, wherein the length measuring means is provided in a form of gradations printed on the upper surface of the body part.

* * * * *